C. L. SLADINSKA.
POTATO DIGGER.
APPLICATION FILED MAR. 9, 1911.
1,035,251.
Patented Aug. 13, 1912.
3 SHEETS—SHEET 1.
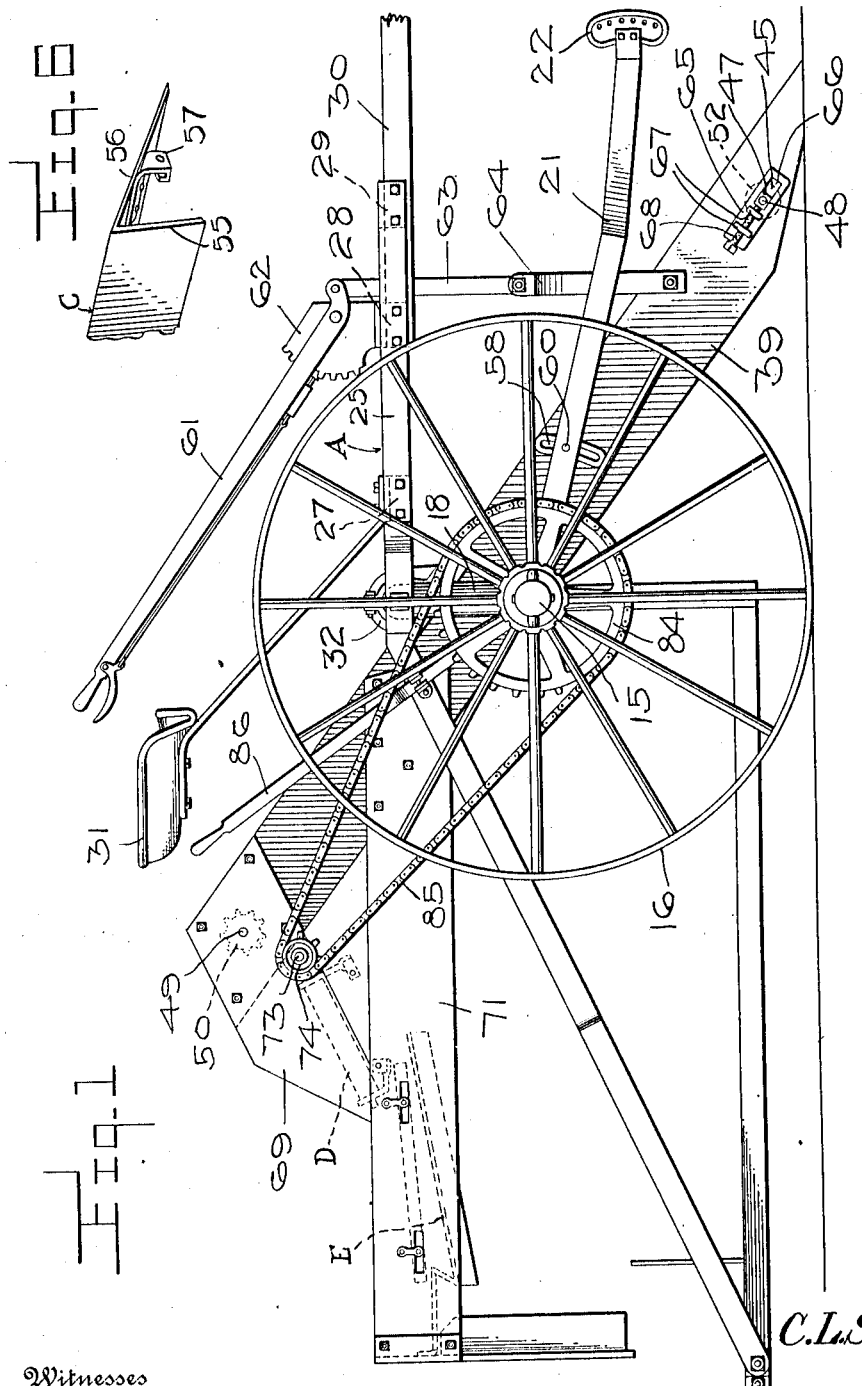
Witnesses
Ed. R. Lusby
Henry T. Bright
Inventor
C. L. Sladinska
By [signature]
Attorney C. L. SLADINSKA.
POTATO DIGGER.
APPLICATION FILED MAR. 9, 1911.
1,035,251.
Patented Aug. 13, 1912.
3 SHEETS—SHEET 2.
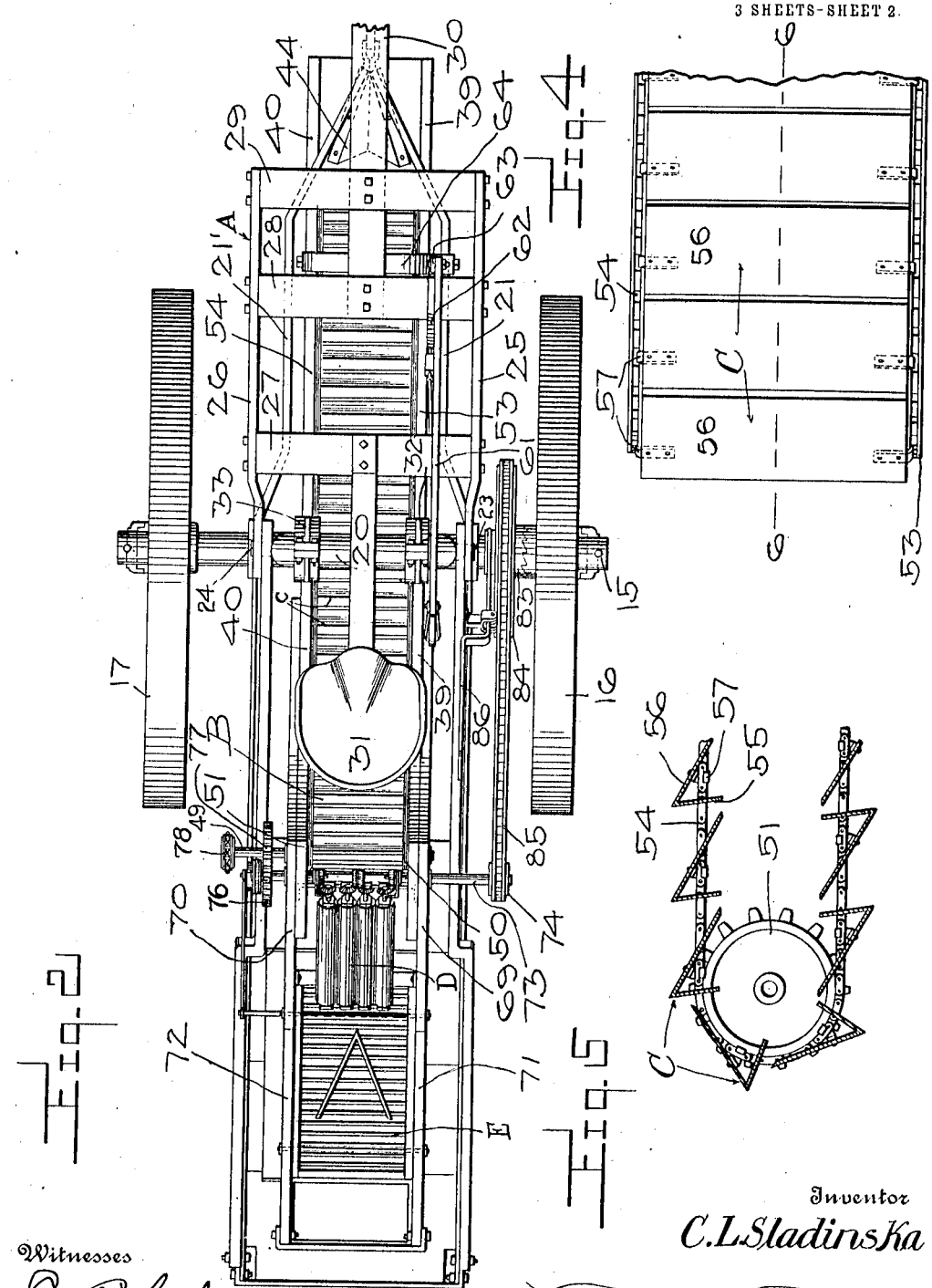

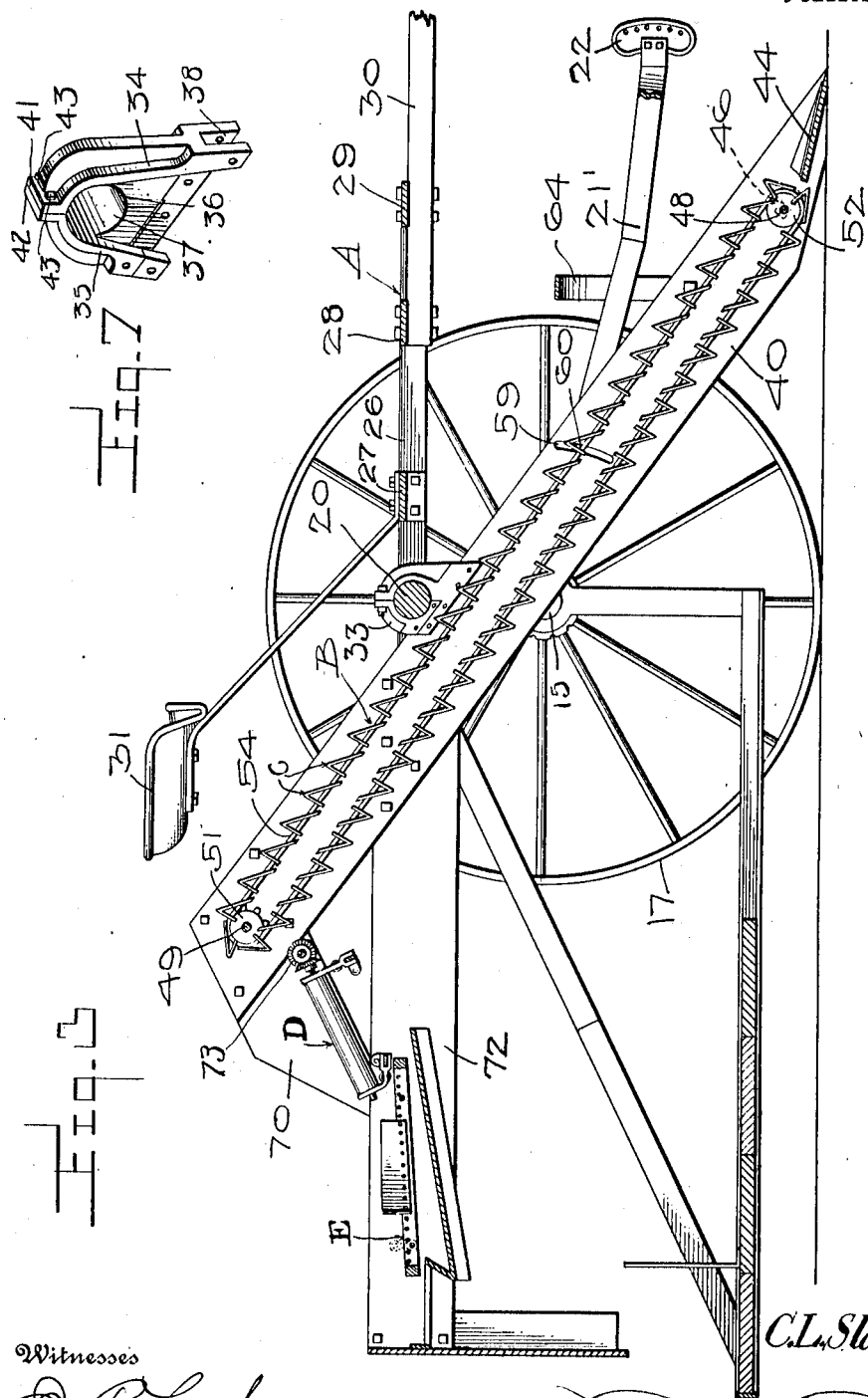

UNITED STATES PATENT OFFICE.

CHARLES L. SLADINSKA, OF FOUNTAIN CITY, WISCONSIN.

POTATO-DIGGER.

1,035,251.  Specification of Letters Patent.  Patented Aug. 13, 1912.

Application filed March 9, 1911. Serial No. 613,301.

*To all whom it may concern:*

Be it known that I, CHARLES L. SLADINSKA, a citizen of the United States, residing at Fountain City, in the county of Buffalo, State of Wisconsin, have invented certain new and useful Improvements in Potato-Diggers; and I do hereby declare the following to be a full, clear, and exact description of the invention, such as will enable others skilled in the art to which it appertains to make and use the same.

This invention relates to potato diggers.

The object of the invention resides in the provision of a traction operated potato digger which includes an improved form of elevator for transporting the potatoes from the shovel which is operatively disposed at the lower end of said elevator.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which:

Figure 1 is a side elevation of a potato digger constructed in accordance with the invention, Fig. 2, a plan view of what is shown in Fig. 1, Fig. 3, a longitudinal section of the potato digger, Fig. 4, a plan view of a fragment of the improved elevator employed in the potato digger. Fig. 5, a section on the line 6—6 of Fig. 4. Fig. 6, a detail perspective view of one end of one of the cross members of the elevator, and Fig. 7, a detail perspective view of one of the supporting clips of the elevator.

Referring to the drawings 15 indicates an axle which has journaled on its respective ends traction wheels 16 and 17. This axle 15 is provided with an intermediate arched or U-shaped portion including arms 18 and 19 and a connecting member 20. Pivotally mounted upon opposite ends of the axle 15 are the inner ends of the arms of a forked draft-bail 21 and 21', said bail carrying at its outer end a clevis 22 for the proper connection of the draft animals through the medium of which latter the machine is drawn along the ground. The axle is provided at each end of the connecting member 20 with lateral extensions 23 and 24 upon which extensions is supported the inner end of a frame A which includes side members 25 and 26 and cross connecting members 27, 28 and 29. Supported by the cross connecting members 28 and 29 in any suitable manner is the inner end of a tongue 30 while suitably supported upon the cross member 27 is a seat 31 for the use of the operator. Rotatably mounted upon opposite ends of the connecting member 20 are supporting clips 32 and 33 each of which includes a pair of members 34 and 35 having mating recesses 36 and 37, forming, after the members 34 and 35 are assembled an opening through which the connecting member 20 extends. The member 34 of each supporting clip is provided in its lower edge with a groove 38 adapted to receive side members 39 and 40 respectively of the elevator or conveyer B. These side members are secured to the member 34 of respective supporting clips by means of bolts passing through said clips and side members. It will be noted that any suitable means may be employed in connecting the member 35 of each clip to the member 34. In this instance the members 34 and 35 are provided with corresponding flanges 41 and 42 which have registering bolt openings receiving bolts 43. The lower end of the member 35 of each supporting clip is grooved to receive a portion of the member 34 and a suitable bolt is then passed through the interlocking portion of said members to secure them together at their lower ends. Mounted between the side members 39 and 40 of the conveyer B at the lower ends of the latter is a digging shovel 44 which is adapted to enter the potato hills as the machine is moved along the ground and thus force the potatoes embedded therein upon the movable conveyer B to be hereinafter described. Formed in the side members 39 and 40 at the rear of the digging shovel 44 are longitudinal slots 45 and 46 respectively and mounted in these respective slots are journal bearings 47 which carry a shaft 48. Journaled between the side members 39 and 40 at the upper end of the latter is a shaft 49 and upon this shaft are fixed sprocket wheels 50 and 51 disposed respectively adjacent the inner faces of the side members 39 and 40. Fixed upon the shaft 48 is a roller 52 and traveling upon this roller and upon the sprocket wheels 50 and 51 are sprocket chains 53 and 54. Connecting the sprocket chains 53 and 54 is a plurality of corresponding cross members C each of which comprises angularly disposed portions 55 and 56 the latter of which has extending from each end a fastening member 57 through the instrumentality of which each cross member C may be secured to the sprocket chains 53 and 54, this connection of the cross member C and the sprocket chains 53 and 54 being accomplished by passing the fastening member 57 into interlocking relation with respective links of said chains and securing said fastening member to said links with suitable pins or bolts.

When the connecting members C are all assembled upon the sprocket chains 53 and 54 the angular portion 56 of one member will be disposed next to the angular portion 55 of the adjacent cross member, it being understood that said angular portions 55 and 56 of adjacent cross members C are sufficiently close together to prevent the potatoes from falling through the space therebetween. By reason of the peculiar formation of the cross member C as clearly illustrated in Fig. 6, it will be apparent that as said cross members pass around the roller 52 adjacent the digging shovel 44 they will effectually hold the potatoes for the necessary upward movement, while the movement of said cross members C around the sprocket wheels 50 and 51 will produce a positive ejecting effect upon the potatoes contained therebetween so as to assure the proper delivery of said potatoes at the upper end of the conveyer B to a vine stripping mechanism D, from which last named mechanism the potatoes are in turn discharged to a sifting mechanism E.

The side members 39 and 40 are provided at corresponding points intermediate their length with arcuate slots 58 and 59 respectively in which are adapted to travel pins 60 projecting from respective arms of the draft bail, the engagement of these pins 60 with the walls of the slots 58 and 59 serving to limit the pivotal movement of the conveyer B on the connecting member 20. The pivotal movement of the conveyer B just referred to is adapted to be manually accomplished by means of a lever 61 pivotally mounted upon a toothed segment 62 which latter is supported upon the cross connecting member 28. This lever 61 is operatively connected to the conveyer B by means of a link 63 which latter is connected to a forked member 64 having its arms respectively secured to the side members 39 and 40 of the conveyer.

Mounted upon the outer face of each of the side members 39 and 40 of the conveyer is a plate 65 which plates are provided respectively with slots 66 in registration with the slots 45 and 46 of said side members. Each of the plates 65 is provided with spaced laterally projecting ears 67 in which is mounted longitudinally of the plate an adjusting screw 68. The journal block 47 is of sufficient length to project through the slot 66 in said plate so as to be engaged by the adjusting screw 68. When the blocks 47 at each side of the conveyer are thus engaged by the adjusting screws 68 respectively it will be apparent that said screws can be manipulated so as to force said blocks toward the forward end of the slots in which they are mounted and this movement of said blocks will in turn serve to tighten the sprocket chains 53 and 54 as will be apparent.

Secured to the outer faces of the side members 39 and 40 respectively are outwardly and rearwardly inclined frame members 69 and 70, the lower ends of which rest upon the upper edges of additional frame members 71 and 72, the inner ends of which latter are securely bolted to the outer face of the side members 39 and 40 respectively. Journaled between the frame members 69 and 70 is a shaft 73 which has the end thereof adjacent the member 69 extended and fixed upon this extension is a sprocket wheel 74. The end of the shaft 73 adjacent the frame member 70 is also extended, and fixed on this extension is a gear wheel 76. The shaft 49 has the end thereof adjacent the side member 40 and the frame member 70 also extended and fixed upon this extension of the shaft 49 is a gear wheel 77 in mesh with the gear wheel 76 on the shaft 73 while the extreme outer end of the extension of the shaft 49 has fixed thereon a sprocket wheel 78 which is adapted for connection with a loading device or other mechanism when desired. The hub of the traction wheel 16 is so constructed at its inner end as to constitute one member of a clutch connection and slidably mounted on the axle 15 between the traction wheel 16 and the arm 18 of the arched portion of said axle is a clutch member 83 adapted to coöperate with the inner end of the hub of the traction wheel 16 so as to impart rotation to the clutch member 83 when desired. Fixed upon this clutch member 83 is a sprocket wheel 84 in alinement with the sprocket wheel 74 on the shaft 73 and traveling on said sprocket wheels 74 and 84 is a sprocket chain 85. The clutch member 83 is adapted to be thrown into and out of engagement with the hub of the traction wheel 16 by means of a hand lever 86 which is suitably connected to said clutch member 83.

By this construction it will be apparent that when the clutch member 83 is thrown into operative engagement with the hub of the wheel 16, said clutch member 83 and sprocket wheel 84 will be rotated and this rotation will be imparted by means of the sprocket chain 85 and sprocket wheel 84 to the shaft 73. It will then be apparent that the rotation of the shaft 73 will by reason of the gear connections 76 and 77 rotate the shaft 49 and drive the elevator or conveyer B.

What is claimed is:

In a conveyer for potato diggers, the combination of a frame including spaced side members, a pair of shafts rotatably mounted between said side members, sprocket wheels fixed on one of said shafts adjacent the inner faces of said side members respectively, a roller fixed on the other shaft, a sprocket chain traveling on each of said sprocket wheels and on corresponding ends of said roller, a plurality of cross members disposed between said sprocket chains and terminating short thereof, connecting members projecting from each end of said cross members and having their free ends secured to respective sprocket chains, said cross members each having a V-shaped cross section and resulting arms one of which is longer than the other and both of said arms normally extending through the plane of said sprocket chains, whereby the free ends of said arms will move relatively to the sprocket chains as the latter travel around their respective sprocket wheels.

In testimony whereof, I affix my signature, in presence of witnesses.

CHARLES L. SLADINSKA.

Witnesses:
CHARLES L. SLADINSKA, Sr.,
H. E. BOHRI,
M. L. FUGINA.

---

Copies of this patent may be obtained for five cents each, by addressing the "Commissioner of Patents, Washington, D. C."